United States Patent
Lalonde et al.

(10) Patent No.: US 7,320,021 B2
(45) Date of Patent: *Jan. 15, 2008

(54) AUTHENTICATING ELECTRONIC COMMUNICATIONS

(75) Inventors: Chris Lalonde, San Jose, CA (US); Marty Abbott, Morgan Hill, CA (US); Kirk Sanford, Liberty, MO (US); Greg Isaacs, San Francisco, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/421,246

(22) Filed: May 31, 2006

(65) Prior Publication Data

US 2006/0206572 A1    Sep. 14, 2006

Related U.S. Application Data

(63) Continuation of application No. 10/266,384, filed on Oct. 7, 2002, now Pat. No. 7,072,944.

(51) Int. Cl.
G06F 15/16 (2006.01)
(52) U.S. Cl. .................. 709/206; 709/207; 709/229
(58) Field of Classification Search ........ 709/206, 709/207, 229
See application file for complete search history.

(56) References Cited

U.S. PATENT DOCUMENTS

| | | | |
|---|---|---|---|
| 5,651,069 A | 7/1997 | Rogaway | |
| 5,682,460 A | 10/1997 | Hyziak | |
| 5,793,497 A | 8/1998 | Funk | |
| 5,898,836 A | 4/1999 | Freivald | |
| 6,182,227 B1 | 1/2001 | Blair | |
| 6,266,692 B1 | 7/2001 | Greenstein | |
| 6,330,590 B1 | 12/2001 | Cotten | |
| 6,443,686 B1 | 9/2002 | Wiesler et al. | |
| 6,640,301 B1 | 10/2003 | Ng | |
| 6,650,890 B1 | 11/2003 | Irlam et al. | |
| 6,684,248 B1 * | 1/2004 | Janacek et al. | 709/225 |
| 6,691,156 B1 * | 2/2004 | Drummond et al. | 709/206 |
| 6,742,036 B1 | 5/2004 | Das et al. | |
| 6,760,752 B1 * | 7/2004 | Liu et al. | 709/206 |
| 6,779,178 B1 | 8/2004 | Lloyd et al. | |
| 7,127,491 B2 * | 10/2006 | Zirnstein, Jr. | 709/206 |
| 2002/0016818 A1 | 2/2002 | Kirani | |
| 2002/0080938 A1 | 6/2002 | Alexander, III | |
| 2003/0187942 A1 | 10/2003 | Quine et al. | |
| 2004/0024823 A1 | 2/2004 | Del Monte | |

* cited by examiner

*Primary Examiner*—Saleh Najjar
(74) *Attorney, Agent, or Firm*—Schwegman, Lundberg & Woessner, P.A.

(57) ABSTRACT

A method includes generating an authenticity indicator for an electronic communication based on a comparison of domain name data and purported sender data associated with the electronic communication, the authenticity indicator indicating a likelihood that the electronic communication was sent from a purported sender of the electronic communication. The authenticity indicator is presented to the recipient of the electronic communication.

21 Claims, 8 Drawing Sheets

AUTHENTICATING ELECTRONIC COMMUNICATIONS

RELATED APPLICATIONS

This application is a Continuation of U.S. application Ser. No. 10/266,384 filed Oct. 7, 2002 now U.S. Pat. No. 7,072,944 which is incorporated herein by reference.

FIELD

The present application relates generally to the field of electronic communications and, more specifically, to a method and apparatus for authenticating electronic communications.

BACKGROUND

With the advent of the Internet, communication by electronic mail or email has become common practice. The Internet is also extensively used to conduct business transactions, and such transactions often require the exchange of confidential information such as credit card details, bank account details, passwords, personal details, and the like. Persons of devious intent often use so-called "spoofed" email messages in order to induce a recipient to furnish confidential information. The perpetrator then uses the confidential information in a fraudulent manner such as, for example, to bid on items, or post fictitious items, on an Internet auction web site.

An email message typically includes a header visible to a recipient that shows who purportedly sent the email ("FROM:" field), to whom the email was sent ("TO:" field), the subject matter of the email ("SUBJECT:" field) and the date and time of sending the email ("DATE:" field). In order to mislead the recipient or victim of the actual source of the email, a person launching a spoof attack typically alters the ("FROM:" field) to reflect a known or reliable source. Thus, when the recipient receives the spoofed email, the "FROM:" field may show an email address that is totally unrelated to the sender. If the recipient were to reply to the email, the sender may then obtain confidential information which the victim believes is being sent to a legitimate source.

BRIEF DESCRIPTION OF THE DRAWINGS

The invention is now described, by way of non-limiting example, with reference to the accompanying diagrammatic drawings in which like reference numerals are used to indicate the same or similar features.

DETAILED DESCRIPTION

A method and apparatus for authenticating electronic mail or email, is described. In the following description, for purposes of explanation, numerous specific details are set forth in order to provide a thorough understanding of the present invention. It will be evident, however, to one skilled in the art that the present invention may be practiced without these specific details.

Figure 1:
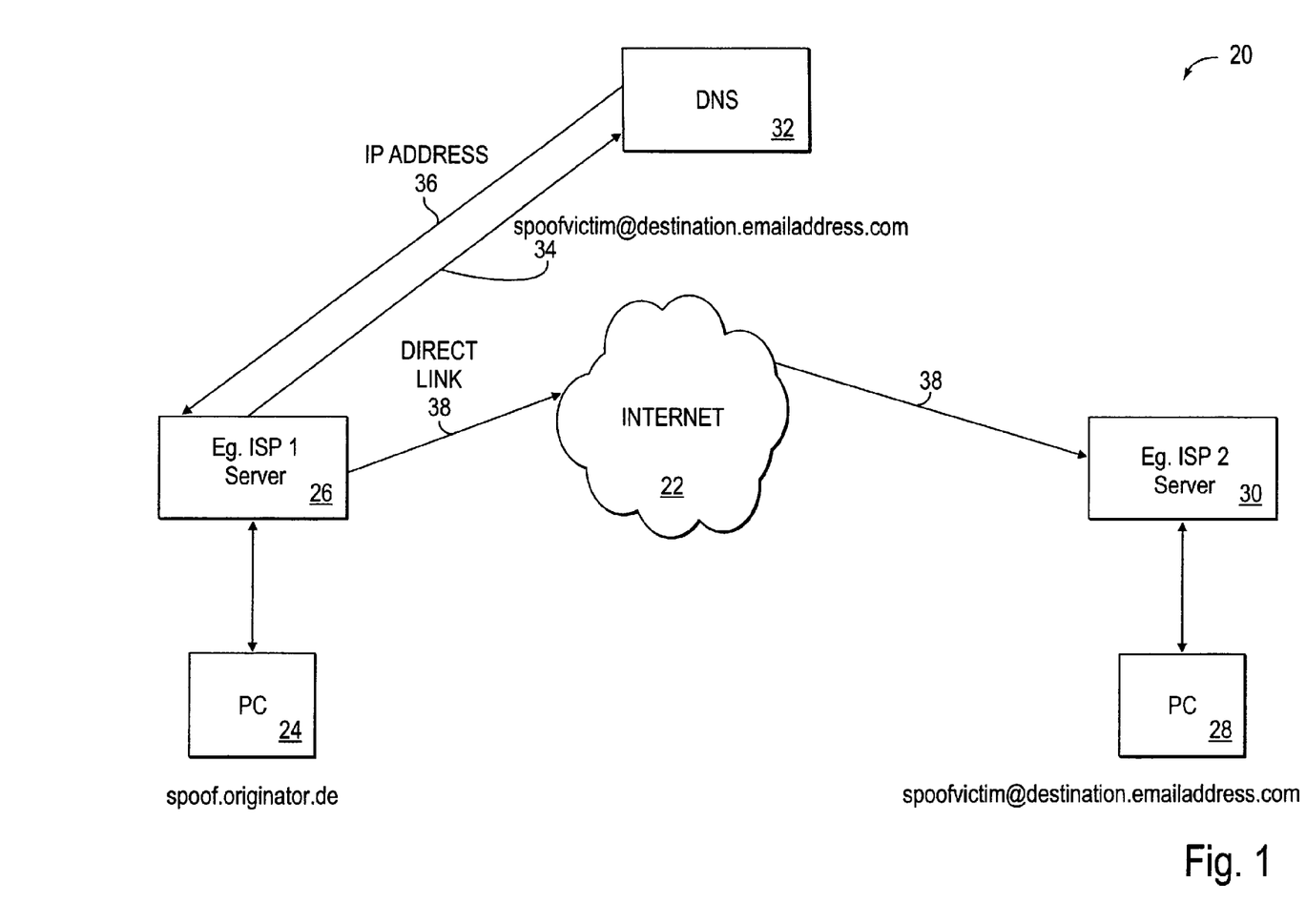
FIG. 1 shows a schematic block diagram of an exemplary hardware arrangement used in communicating electronic mail or email via the Internet.

Referring to the drawings, reference numeral 20 generally indicates an exemplary hardware arrangement for communicating an electronic message or email via the Internet 22. The arrangement 20 includes a client machine defined by a sender or source personal computer (PC) 24 connected to its associated Internet Service Provider (ISP) 26, and a further client machine defined by a destination PC 28 connected to its associated ISP 30. Although only two PCs 24, 28 are shown in the drawings, it will obviously be appreciated that the drawing in FIG. 1 is representative of any two PCs connected to the Internet which may communicate email between any one or more other PCs.

For the present discussion, the PC 24 is a source PC which may be used to communicate spoofed email to the destination PC 28. Spoofed email is typically email in which the sender or originator conceals, or attempts to conceal, his or her true identity to the recipient of the email. Concealing the source of the email is often linked to devious conduct in which the sender intends to induce the recipient to furnish confidential information such as bank account details, credit card details, personal details, or the like. Such details may be used, for example, in an Internet auction environment, to fraudulently bid on items up for auction, post fictitious items for sale, and other devious activities.

Returning to FIG. 1, when sending email, the PC 24 uses its mail client to communicate with the ISP 26. The ISP 26 identifies the destination email address from the email message received from the PC 24 and interrogates a Domain Name Server (DNS) 32 (see arrow 34). The DNS 32 uses the domain name (destination.emailaddress.com) of the destination email address to identify an IP address associated with the domain name. The DNS 32 then returns the associated IP address, as shown by arrow 36, to the ISP 26 thereby to identify the destination IP address of the email sent by the PC 24. The ISP 26, once it has identified the destination IP address, communicates the email message, via the Internet and direct links 38, to the ISP 30. The ISP 30 then typically identifies the recipient (spoofvictim) and then communicates the email to the PC 28. As discussed in more detail below, the email is disguised so that it appears to be from a legitimate source whereas, in fact, it has been sent from the spoof originator who is typically trying to obtain confidential data from the recipient or spoof victim.

Figure 2:
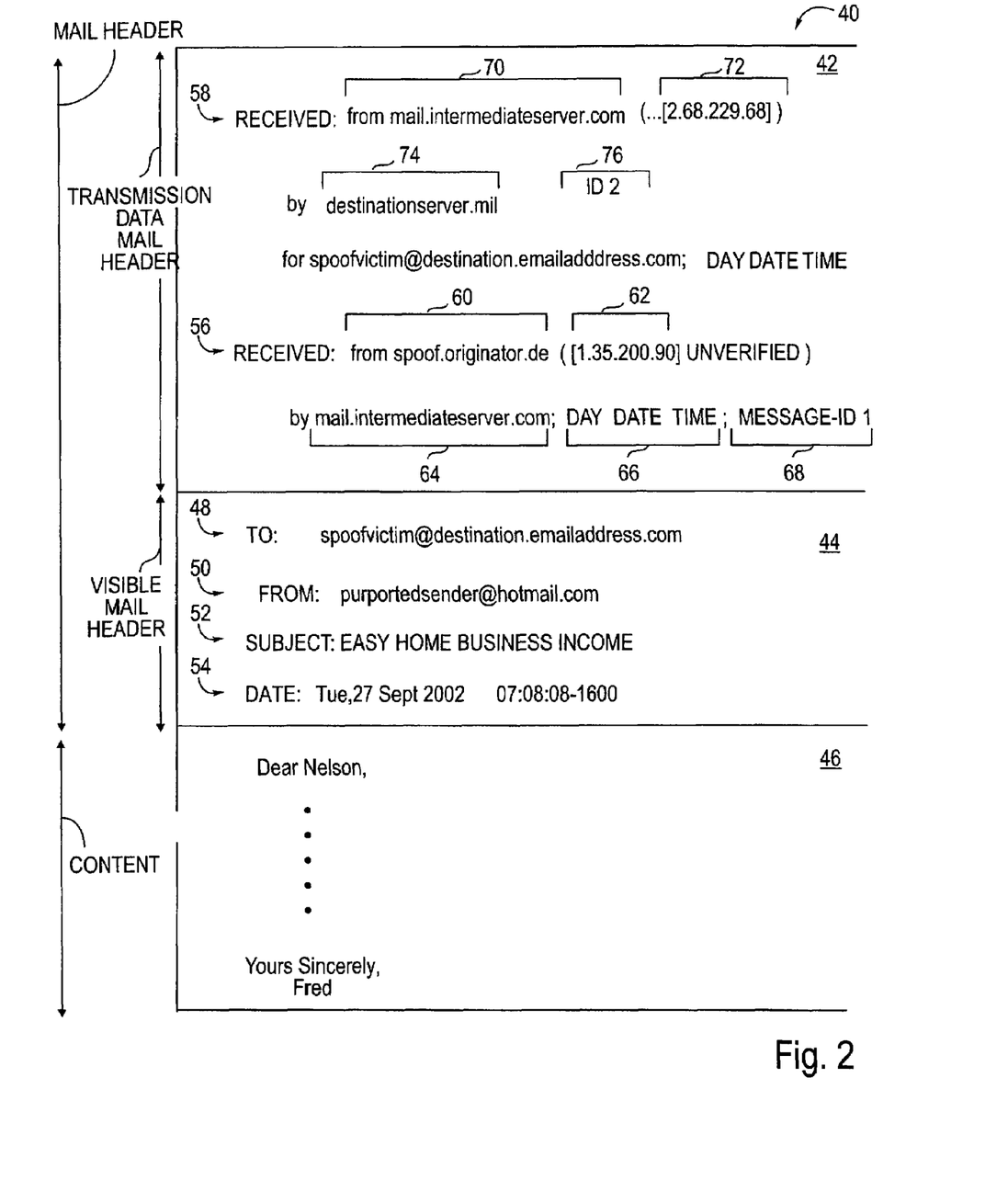
FIG. 2 shows a schematic representation of an exemplary header of email.

Referring in particular to FIG. 2, an exemplary email is generally indicated by reference numeral 40. The email 40 includes a transmission data mail header 42, a visible mail header 44 and a content portion 46. In the content portion 46, a user typically types the content of the message, or includes HTML pages or the like. The visible mail header 44 is typically that which is visible on a screen of a PC of the recipient which, in this case, is the spoof victim. In certain embodiments, the visible mail header 44 includes a "TO" field 48, a "FROM" field 50, a "SUBJECT" field 52 and a "DATE" field 54. Although most emails include the aforementioned four fields, it is to be appreciated that these are merely exemplary fields and, in certain circumstances, further or other fields may be provided. The transmission data mail header 42 is typically not visible to a recipient of the email who only sees the visible mail header 44 and the content portion 46.

The transmission data mail header 42 includes data included in the email 40 by each server via which the email 40 is communicated to the recipient or spoof victim. In one embodiment, the servers include two "RECEIVED" fields 56 and 58. It is to be appreciated that the number of RECEIVED fields 56, 58 is dependent of the number of servers via which the email 40 is communicated and, in certain circumstances, a single server may add more than one RECEIVED field 56, 58 due to internal processing. Each received field includes a "from" section, and IP address, a section including the name of the server receiving the email 40, a section including day, date, time details, and a section including a message ID which the server adds uniquely to identify the email 40.

Although many client applications automatically populate the FROM field 50 with the sender's email address, this field may however be changed with relative ease. For example, applications are freely available which allow the sender of an email to alter this field to reflect different sender information. As it is typically this field which is displayed to the recipient of the email, a sender of spoofed email 40 typically alters this field to show an email address of a trusted or legitimate sender. For example, the sender of spoofed email typically inserts a purported sender at a known or legitimate domain name in this field such as support@eBay.com, support@hotmail.com, or the like. Likewise, an appealing subject matter heading it typically included in the email 40 to encourage the recipient to respond, and the information included in the content portion 26 is typically equally misleading. In certain circumstances, a spoof sender may include a web page in the content portion 46 that requests confidential data from the recipient and, accordingly, if the recipient responds to the email, the spoof originator may then capture this confidential information as the victim is replying to the spoofed email address and not the purported email address displayed in the FROM field 50.

However, unlike the FROM field 50 in the visible header 44 that may be changed with relative ease, the RECEIVED field 56 in the transmission data mail header 42 generally includes accurate or actual data that correctly identifies the sender. Thus, the RECEIVED field 56 in its from section 60 includes the actual source of the email 40 (spoof.originator.de in the current example). Further, the RECEIVED field 56 also includes an actual IP address 62 which, in the present example, is shown as unverified. Further, the RECEIVED field 56 includes the name of the server 64 receiving the email 40 as well as comprehensive day, date and time information 66 and a message identification or ID 68, which is unique to the particular server. Thus, although the FROM field 50 in the visible mail header 44 has been altered to show a purported sender (purportedsender@hotmail.com) the actual sender (spoof.originator.de) is reflected in the transmission data mail header 42.

When the email 40 is passed on to one or more further servers, one or more further RECEIVED fields 58 are included in the transmission data mail header 42 of the email 40. For example, the RECEIVED field 58 includes in its from field 70 the domain name (mail.intermediateserver.com) of the server from which it has received the email 40 (see name of the server 64 in RECEIVED field 56), the IP address 72 of the mail server that sent the message, its own domain details (destinationserver.mil), and its unique ID 76. It also includes the email address of the victim (spoofvictim@destination.emailaddress.com), and date, time and day details. Thus, a so-called "paper trail" of details is provided in the transmission data mail header 42 which shows a history of the actual servers and domains since the inception of the email 40.

Figure 3:
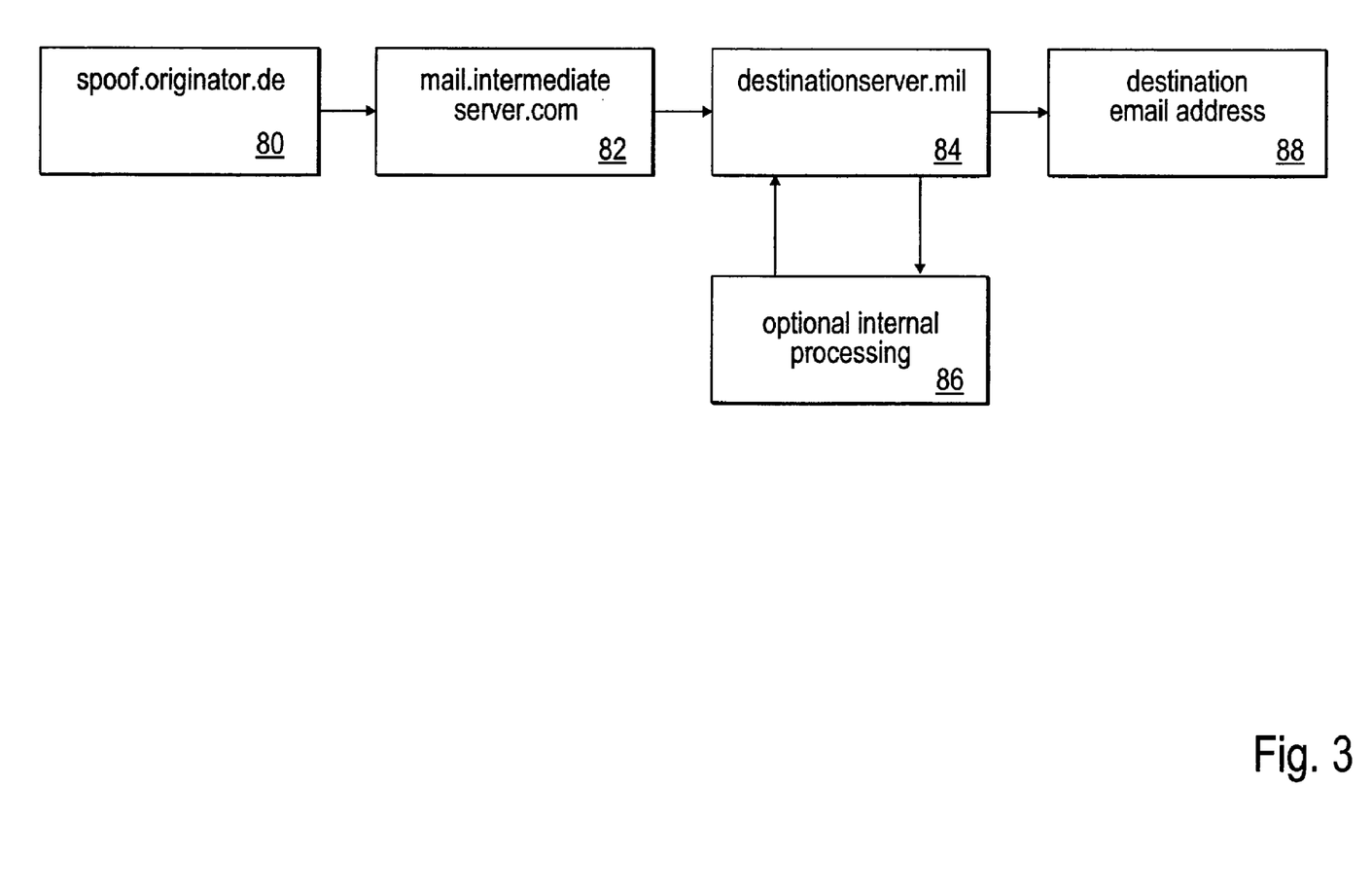
FIG. 3 shows a schematic block diagram of a server arrangement that may be used by a spoof originator to send spoofed email.

As mentioned above, the transmission data mail header 42 may include a plurality of RECEIVED fields 56, 58 wherein each field is added via a server via which the email 40 is communicated to its final destination. Typically, a spoofed email from a person of devious intent is sent to an intermediate server in order to attempt to conceal the actual source of the email as shown in FIG. 3. In particular, a sender of spoofed email e.g. via the PC 24 communicates it to the ISP 26 which is shown as server 80 in FIG. 3 (spooforiginator.de). Thus, in the present example, the spoof originator is located in Germany and communicates with his or her local ISP identified as spooforiginator.de. Thereafter, the email 40 is communicated to an intermediate server 82 (mail.intermediateserver.com) in order to attempt to disguise the source of the email 40. Thereafter, the email 40 is sent to the destination server 84 (destinationserver.mil) and, in certain circumstances, optional internal processing may take place at the destination server 84 as shown at block 86. The destination server 84 then communicates the email 40, after adding its RECEIVED field 58 to the mail header, to the destination email address 88, which the PC 28 may then receive from its ISP 30. The above discussion provides an example of how a spoofer communicates spoofed email using various servers to the destination PC 28 wherein the actual source displayed in the visible mail header 44 is disguised. However, in accordance with the present invention, the email 40 may be authenticated by investigating data in the mail header of the email 40 and generating an authenticity indicator in response to the investigation.

Figure 4:
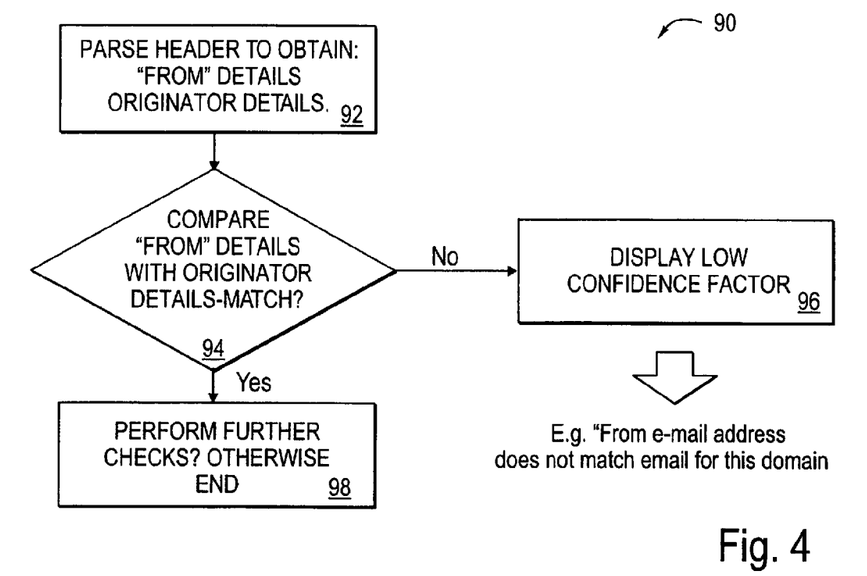
FIG. 4 shows a schematic flow diagram of a method, in accordance with the invention, for comparing originator data in a header of an email.

Referring in particular to FIG. 4, reference numeral 90 generally indicates a method, in accordance with an exemplary embodiment of the invention, for authenticating the email 40. At block 92, the method 90 parses the transmission data mail header 42 and the visible mail header 44 to obtain transmission details. In particular, the method 90 investigates or analyses the visible mail header 44 to extract details or data included in the FROM field 50 such as the domain name of the purported sender (hotmail.com). Further, the method 90 analyses the transmission data mail header 42 to extract actual originator data such as the actual domain name of the actual sender of the email 40 from the RECEIVED field 56. The actual domain name from which the email 40 was sent is provided in the from section 60 and is shown as "spoof.originator.de" in the email 40. Once the aforementioned data has been extracted, as shown at decision block 94, the method 90 then compares the domain name from the FROM field 50 (purported sender data) with the domain name from the RECEIVED field 56 (actual originator data) and, if the two domain names do not match, the method 90 provides a confidence factor or authenticity indicator to the recipient of the email as shown at block 96. In one embodiment, the confidence factor displayed by the method 90 is in the form of a comment such as, for example, "this email is from an email address that does not match the mail server for its domain", "this email does not appear to have been sent from the purported sender", or the like. It is however to be appreciated that any warning or confidence factor may be provided to the recipient of the email. For example, in certain embodiments, the confidence factor may be in the form of number within a particular range e.g. 1 to 10, a percentage, or the like. Returning to decision block 94, if the domain name extracted from the FROM field 50 matches the domain name in the RECEIVED field 56, the method 90 may then perform further checks as shown at block 98 or it may terminate.

Figure 5:
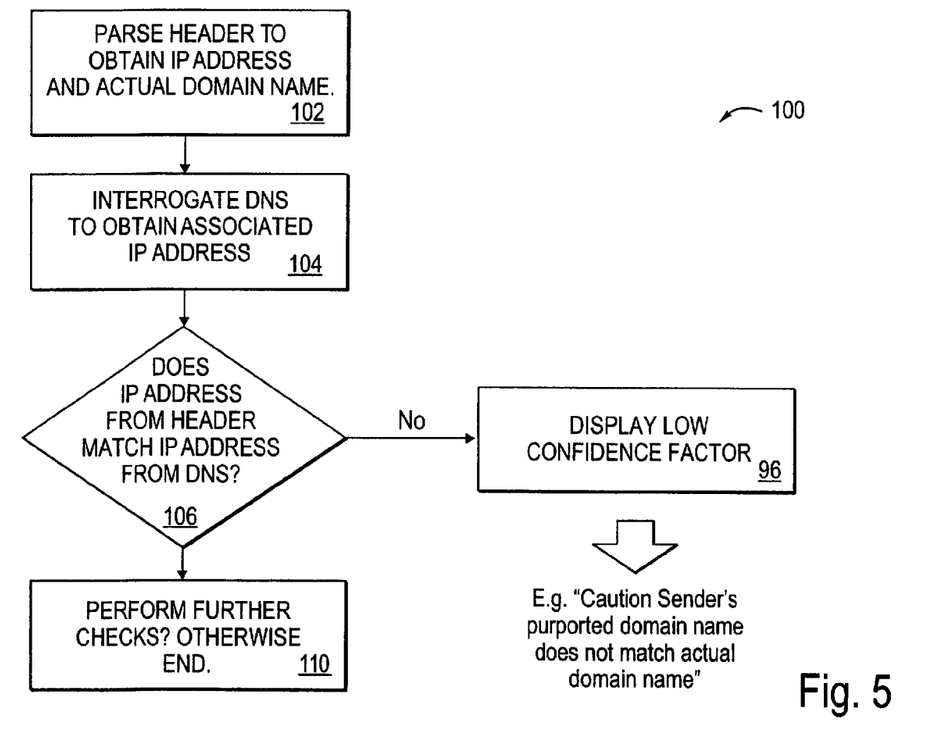
FIG. 5 shows a schematic flow diagram of a method, in accordance with the invention, for investigating domain name data in a header of an email.

Reference numeral 100 generally indicates a further method, in accordance with an exemplary embodiment of the invention, for authenticating the email 40. The method 100 parses the header, in particular the transmission data mail header 42, to obtain a purported IP address 62 from the RECEIVED field 56 (see block 102). Thereafter, at block 104, the method 100 interrogates or communicates with the DNS 32 (see FIG. 1) during which the actual domain name of the sender 60 extracted from the RECEIVED field 56, is communicated to the DNS 32 to obtain an IP address associated with the domain name extracted from section 60. The DNS 32 returns an IP address associated with the actual domain name as shown by line 36 in FIG. 1 (the actual IP address of the actual originator). At decision block 106, the method 100 then compares the actual IP address obtained from the DNS 32 with the purported IP address 62 provided in the RECEIVED field 56 and, if they do not match, a low authenticity indicator is displayed to the user as shown at block 108. For example, as in the case of the authenticity indicator displayed by the method 90, the authenticity indicator displayed by the method 100 may include a warning such as "Caution: sender's purported domain name does not match actual domain name". It is however to be appreciated that any message or indicator may be provided to the user to alert the user of the discrepancy. Thus, a user is warned if the IP address 62 is not associated with the actual originator of the email. Returning to decision block 106, if the IP address from the header does in fact match the IP address 62 from the DNS 32, then the method 100 may perform further checks as shown at block 110 or otherwise terminate.

Figure 6:
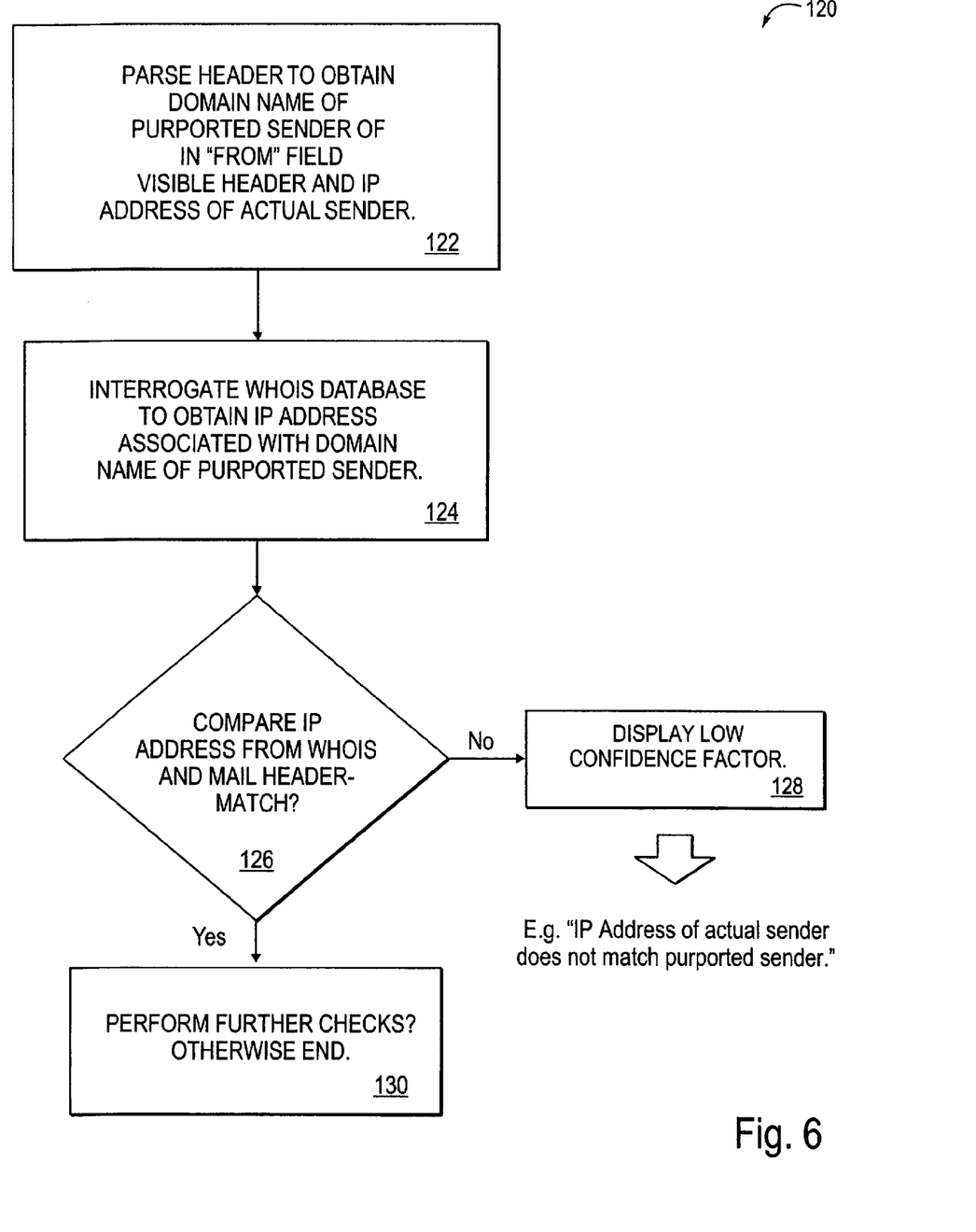
FIG. 6 shows a schematic flow diagram of a method, in accordance with the invention, for investigating an IP address provided in a header of an email.

Referring in particular to FIG. 6, reference numeral 120 generally indicates a method, in accordance with a further exemplary embodiment of the invention, for authenticating the email 40. When executed, the method 120 parses the visible mail header 44 to obtain the domain name of the purported sender from the FROM field 50 and also obtains the IP address 62 from the RECEIVED field 56 of the transmission data mail header in block 122. Thereafter, the method 120 interrogates or communicates with a "WHOIS" database. In particular, the method 120 provides the WHOIS database with the purported domain name (hotmail.com) of the purported sender to obtain an IP address associated with the particular domain name of the purported sender as shown at block 124. Thereafter, at decision block 126, the method 120 compares the IP address from the WHOIS database with the IP address 62 extracted from the transmission data mail header 42 to determine whether or not they match. If, as shown at block 128, the domain name from the WHOIS database and the transmission data mail header 42 do not match, then a low confidence factor or authenticity indicator is displayed to the user. For example, the method 120 may indicate to the user that the "IP address of the actual sender does not match that of the purported sender". However, if the IP address from the WHOIS database and the mail header match then, as shown at block 130, the method may terminate or perform further checks.

It is to be appreciated that any one or more of the exemplary methods 90, 100, and 120 may be performed when validating or authenticating electronic mail. Further, the confidence factor or authenticity indicator provided to the user may be in any form which indicates a warning or cautions the user of the possibility of the email 40 being spoofed. Likewise, in other embodiments of the invention, the authenticity indicator may be provided when there is a match between the various parts of the header being investigated.

Figure 7:
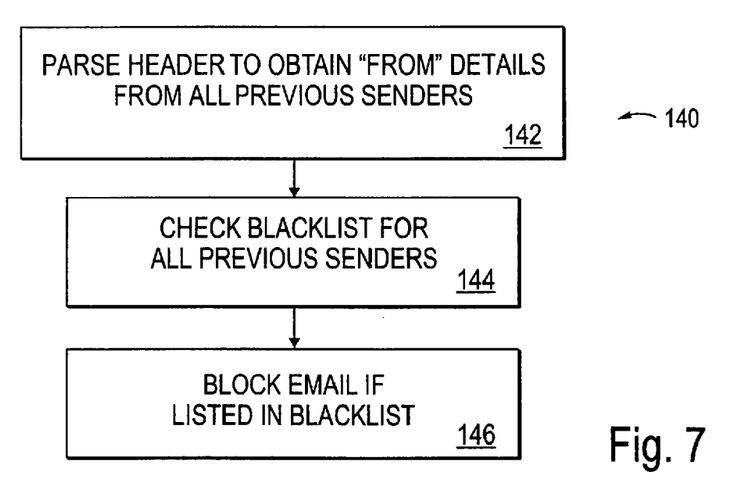
FIG. 7 shows a schematic flow diagram of a method for checking a blacklist including sources from which a spoofed email may be sent.

Referring to FIG. 7, reference numeral 140 generally indicates a further method, in accordance with an exemplary embodiment of the invention, for authenticating an email. The method 140 parses the transmission data mail header 42 to obtain domain name data in the from sections 60, 70 of the RECEIVED fields 56, 58 respectively. If the email 40 has passed through further servers, these fields are also investigated in the RECEIVED fields added by the further servers to obtain a comprehensive list of all domain names in the header of the email 40 (see block 142). Thereafter, the domain names extracted from the transmission data mail header 42 are compared to a blacklist of senders as shown in block 144. The blacklist of senders includes a list of all domain names that are likely to be a source of unwanted email such as spoofed email and, as in the methods described above, a confidence factor or authenticity indicator may be provided to the recipient (reader) of the email 40. In certain embodiments, the method 140 blocks emails which have been sent from a blacklisted server as shown in block 146. In one embodiment, in order to enhance the effectivity, the method 140 updates its blacklist of emails using the exemplary method 150 of FIG. 8.

Figure 8:
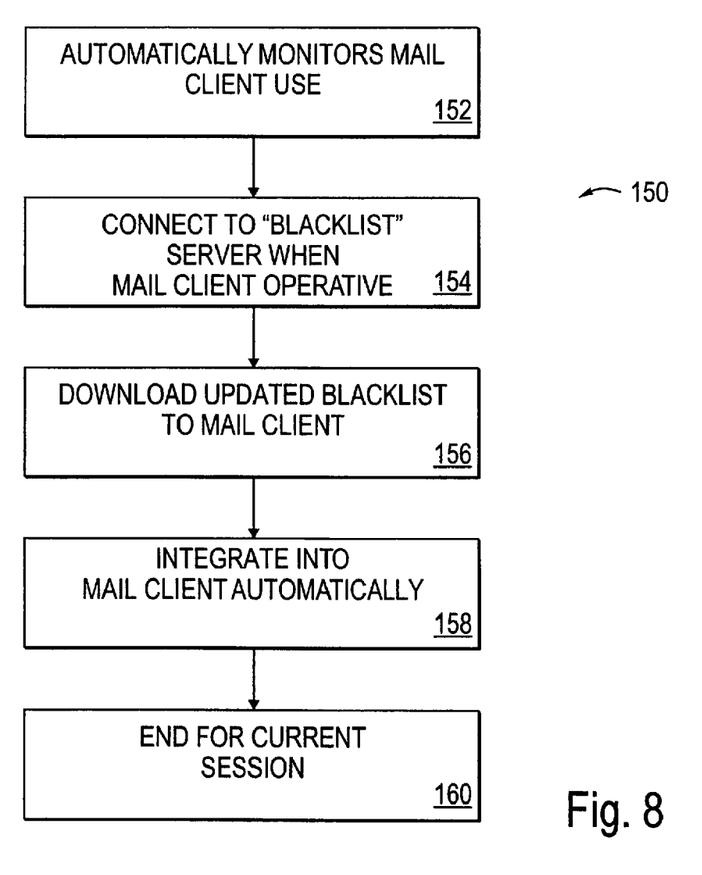
FIG. 8 shows a schematic flow diagram of a method, in accordance with the invention, for updating a blacklist of potential senders of spoofed email.

The method 150, as shown at block 152, automatically monitors when a user activates a mail client on a PC. When the method 150 detects user activity or an appropriate connection (e.g. to the Internet), it connects to a blacklist server as shown at block 154. In one embodiment, the method 150 connects to the blacklist server when the mail client is operative. As shown at block 156, the method 150 then downloads an updated blacklist to the mail client and thereafter integrates the updated list into the mail client in an automated fashion, as shown at block 158. Once the updated blacklist has been downloaded, the method 150 typically terminates for the current session as shown at block 160.

Figure 9:
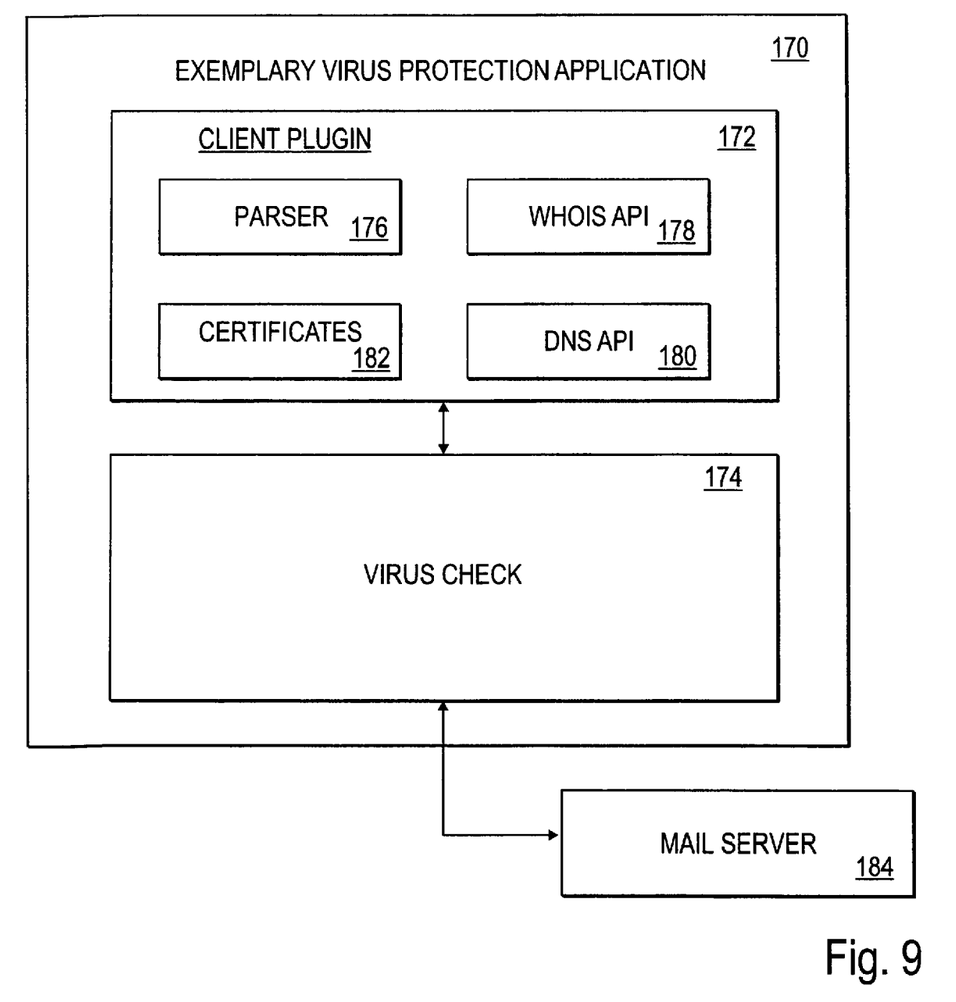
FIG. 9 shows a schematic block diagram of an exemplary virus protection application, in accordance with the invention, which checks for spoofed email.

Reference numeral 170 generally indicates an exemplary virus protection application, which in addition to its virus protection functionality, includes one or more of the methods 90, 100, 120, 140 and 150. In one embodiment, the application 170 includes the methods 90, 100, 120, 140 and 150 in the form of a client plugin 172 which interacts with virus check functionality 174. To execute the functionality described above, the client plugin 172 includes a parser module 176, a WHOIS API 178, a DNS API 180 and digital certificates 182. The application 170 is typically provided on a client machine (e.g. PCs 24 and 28) and communicates with a mail server 184 so that, when the client machine receives email from the mail server 184, the client plugin 172 authenticates the email 40 as described herein. Thus, each time the virus protection application 170 checks an email for a virus, it also authenticates the email to obtain an authentication indicator which informs a user of the likelihood of the email being spoofed.

Figure 10:
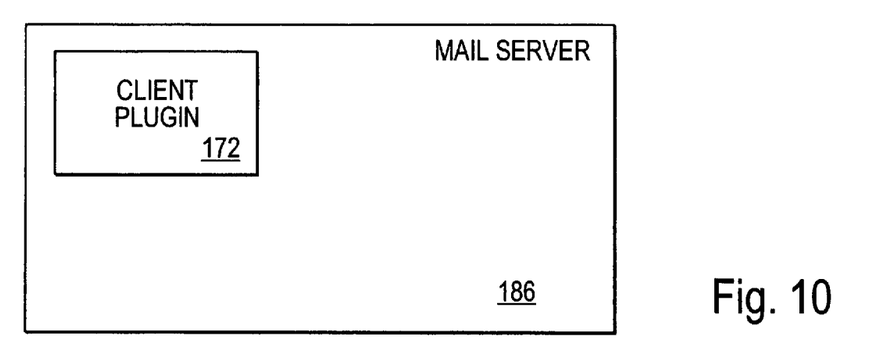
FIG. 10 shows a schematic block diagram of a mail server including a client plugin for identifying potentially spoofed email.

Although the application 170 typically resides on a client machine, in other embodiments of the invention, the client plugin 172 is provided on a mail server 186. Thus, prior to the client machine downloading messages from the mail server 186, the mail server 186 performs the authentication methodology described herein. The appropriate messages may then be included in information communicated to the client machine.

Figure 11:
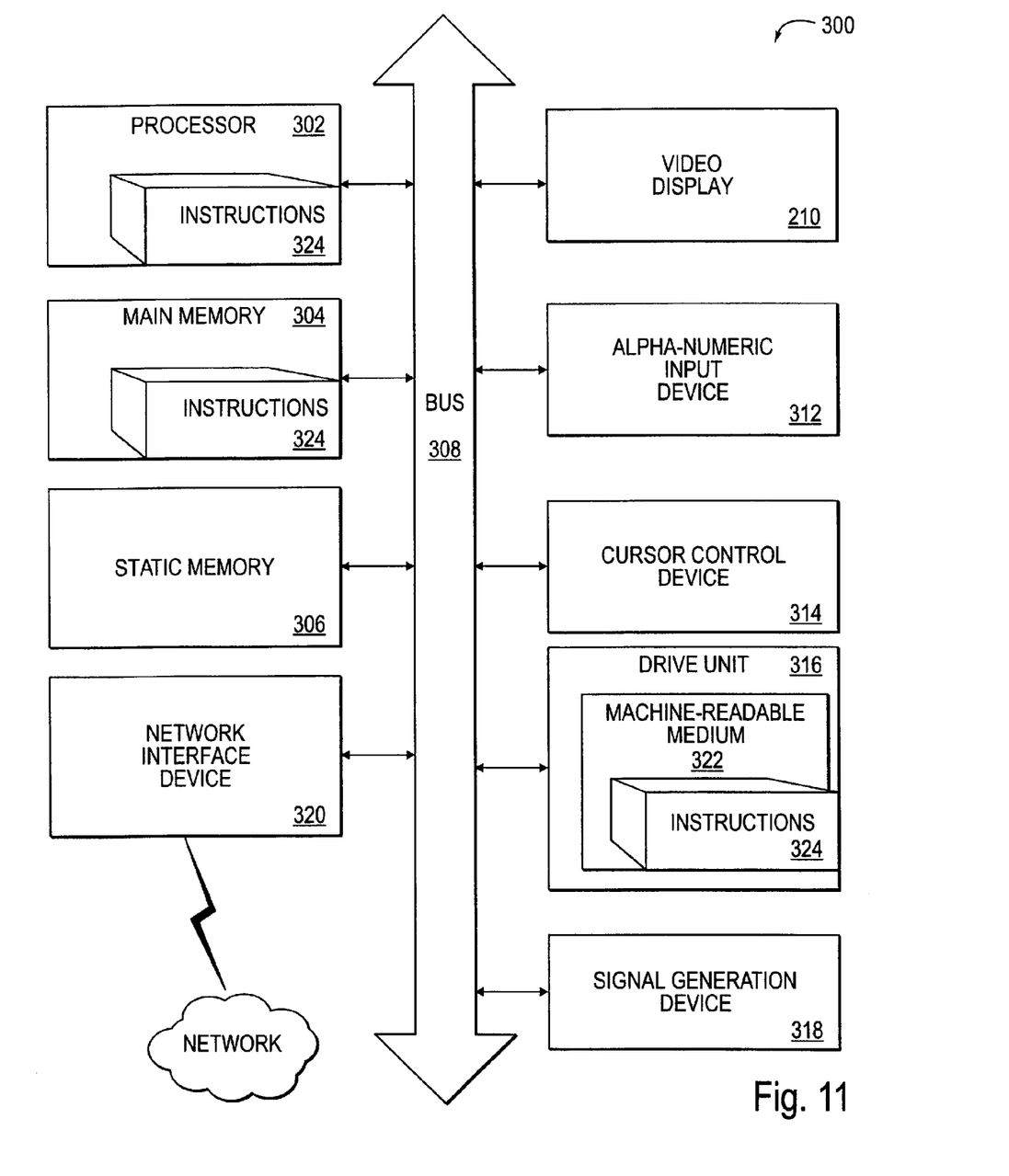
FIG. 11 shows a schematic block diagram of an exemplary computer for executing any one of the methods described herein.

FIG. 11 shows a diagrammatic representation of machine in the exemplary form of the computer system 300 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 300 includes a processor 302, a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g. a keyboard), a cursor control device 314 (e.g. a mouse), a disk drive unit 316, a signal generation device 318 (e.g. a speaker) and a network interface device 320. The various components of the computer system 300 may be included in the mail server 186.

The disk drive unit 316 includes a machine-readable medium 322 on which is stored a set of instructions (software) 324 embodying any one, or all, of the methodologies described above. The software 324 is also shown to reside, completely or at least partially, within the main memory 304 and/or within the processor 302. The software 324 may further be transmitted or received via the network interface device 320. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and carrier wave signals.

Thus, a method and apparatus for authenticating an email have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of authenticating an electronic communication, the method including:
    parsing a header of the electronic communication to obtain a header IP address of an originator of the electronic communication and to obtain a purported domain name of a purported sender of the electronic communication;
    interrogating a business entity database with the purported domain name to obtain an associated IP address associated with the purported domain name;
    comparing the header IP address and the associated IP address;
    generating an authenticity indicator for the electronic communication based on the comparison of the header IP address and the associated IP address, the authenticity indicator indicating a likelihood that the electronic communication was sent from a purported sender of the electronic communication; and
    presenting the authenticity indicator to the recipient of the electronic communication.

2. The method of claim 1, wherein the parsing of the header to obtain the header IP address of the originator of the electronic communication and the purported domain name of a purported sender of the electronic communication includes:
    parsing the header to obtain purported sender domain name data in a "FROM: . . ." field populated at a communication client, the purported sender domain name data being visible to a recipient of the electronic communication.

3. The method of claim 2, wherein the parsing of the header to obtain purported domain name data includes:
    parsing the header to obtain domain name data of each server via which the electronic communication has been communicated;
    comparing the domain name data of each server with reference domain name data; and
    generating the authenticity indicator in response to the comparison.

4. The method of claim 3, wherein the reference domain name data includes domain names associated with spoofed electronic communications, the method including updating the reference domain name data in an automated fashion.

5. The method of claim 3, wherein the reference domain name data is stored on a client machine, the method including:
    connecting the client machine to a remote database of reference domain name data;
    downloading updated reference domain name data; and
    storing the reference domain name data on the client machine.

6. The method of claim 1, further includes:
    parsing the header to obtain a purported IP address of originator of the electronic communication;
    comparing the associated IP address with the purported IP address; and
    generating the authenticity indicator in response to the comparison.

7. The method of claim 1, wherein the header of the electronic communication includes a visible mail header which is visible to the recipient when opening the electronic communication, and a transmission data mail header including received data included by at least one server via which the electronic communication is communicated, the method including investigating data in both the visible and transmission data mail headers.

8. A machine-readable medium embodying instructions that, when executed by a machine, cause the machine perform a method including:
    parsing a header of an electronic communication to obtain a header IP address of an originator of the electronic communication and to obtain a purported domain name of a purported sender of the electronic communication;
    interrogating a business entity database with the purported domain name to obtain an associated IP address associated with the purported domain name;

comparing the header IP address and the associated IP address;

generating an authenticity indicator for the electronic communication based on the comparison of the header IP address and the associated IP address, the authenticity indicator indicating a likelihood that the electronic communication was sent from a purported sender of the electronic communication; and presenting the authenticity indicator to the recipient of the electronic communication.

9. The machine-readable medium of claim 8, wherein the method includes parsing the header of the electronic communication to identify the purported sender data included in the header of the electronic communication.

10. A server for authenticating electronic communications communicated between the server and at least one client device, the server including:

a communication interface to communicate with the at least one client device;

a processor; and memory including instructions that, when executed by the processor, cause the processor to:

parsing a header of an electronic communication to obtain a header IP address of an originator of the electronic communication and to obtain a purported domain name of a purported sender of the electronic communication;

interrogating a business entity database with the purported domain name to obtain an associated IP address associated with the purported domain name;

comparing the header IP address and the associated IP address;

generate a confidence factor for electronic communication based on the comparison of the header IP address and the associated IP address, the confidence factor indicating a likelihood that the electronic communication was sent from a purported sender of the electronic communication; and present the confidence factor to the recipient of the electronic communication.

11. The server of claim 10, wherein instructions cause the processor to:

parse the header of the electronic communication to obtain domain name data of each server via which the electronic communication has been communicated;

compare the domain name data of each server with reference domain name data; and generate the confidence factor in response to the comparison.

12. The server of claim 11, wherein the reference domain name data includes domain names associated with spoofed electronic communications and the reference domain name data is updated in an automated fashion.

13. The server of claim 10, wherein the confidence factor is a warning regarding an origin of the electronic communication.

14. The server of claim 13, wherein the warning advises that the purported sender data does not match the domain name data.

15. The server of claim 13, wherein the warning cautions a user of a possibility of the electronic communication being spoofed.

16. The server of claim 10, wherein the confidence factor is a number within a confidence range.

17. A server for authenticating electronic communication communicated between the server and at least one client device, the server including:

communication means for communicating with the at least one client device; processing means; and memory means for storing instructions which, when executed by the processing means, cause the processing means to:

parsing a header of an electronic communication to obtain a header IP address of an originator of the electronic communication and to obtain a purported domain name of a purported sender of the electronic communication;

interrogating a business entity database with the purported domain name to obtain an associated IP address associated with the purported domain name;

comparing the header IP address and the associated IP address;

generate an authenticity indicator for the electronic communication based on a comparison of the header IP address and the associated IP address, the authenticity indicator indicating a likelihood that the electronic communication was sent from a purported sender of the electronic communication; and present the authenticity indicator to the recipient of the electronic communication.

18. The server of claim 17, wherein the authenticity indicator is a warning regarding an origin of the electronic communication.

19. The server of claim 18, wherein the warning advises that the purported sender data does not match the domain name data.

20. The server of claim 18, wherein the warning cautions a user of a possibility of the electronic communication being spoofed.

21. The server of claim 17, wherein the authenticity indicator is a number within a confidence range.

* * * * *

UNITED STATES PATENT AND TRADEMARK OFFICE
CERTIFICATE OF CORRECTION

PATENT NO. : 7,320,021 B2  
APPLICATION NO. : 11421246  
DATED : January 15, 2008  
INVENTOR(S) : Lalonde et al.

Page 1 of 2

It is certified that error appears in the above-identified patent and that said Letters Patent is hereby corrected as shown below:

On sheet 4 of 8, in Fig. 4 (below box 96), line 3, after "domain" insert -- ". --.
As shown in the attached page.

In column 4, lines 29-30, delete "spooforiginator.de" and insert
-- spoof.originator.de --, therefor.

In column 4, line 32, delete "spooforiginator.de" and insert
-- spoof.originator.de --, therefor.

In column 8, line 45, in Claim 6, before "originator" insert -- the --.

In column 9, line 33, in Claim 10, after "for" insert -- the --.

Signed and Sealed this

Twenty-ninth Day of July, 2008

JON W. DUDAS  
*Director of the United States Patent and Trademark Office*

Fig. 4

Fig. 5